United States Patent [19]

Danville

[11] 4,370,428

[45] Jan. 25, 1983

[54] PIGMENTED PEROXIDE AND POLYESTER COMPOSITIONS

[76] Inventor: Carlos R. Danville, 4505 Gilhouse St., Toledo, Ohio 43623

[21] Appl. No.: 197,798

[22] Filed: Oct. 17, 1980

[51] Int. Cl.³ .......................... C08K 5/00; C08L 67/00
[52] U.S. Cl. .................................... 523/508; 523/513; 523/514; 523/527
[58] Field of Search ............. 260/40 R; 523/508, 513, 523/514, 527

[56] References Cited

U.S. PATENT DOCUMENTS

| | | | |
|---|---|---|---|
| 3,642,672 | 2/1972 | Kroekel | 260/40 R |
| 3,821,155 | 6/1974 | Kloos | 260/40 R |
| 4,101,604 | 7/1978 | Rowe | 260/40 R |

*Primary Examiner*—J. Ziegler
*Attorney, Agent, or Firm*—Norbert M. Lisicki

[57] ABSTRACT

Polyester and hardener compositions have incorporated therein pigments of Toluidine Red Y and Parachlor R to enable the user to determine when mixing is uniform and when the cure has been completed.

10 Claims, No Drawings

PIGMENTED PEROXIDE AND POLYESTER COMPOSITIONS

BACKGROUND OF THE INVENTION

1. Field of the Invention

This invention relates to polyester compositions. More particularly, this invention relates to polyester patching compositions which have incorporated therein pigments which indicate when the catalyst and polyester have been uniformly mixed and further indicate when the composition has cured sufficiently to permit further working of the patched area.

2. State of the Art

It is well known in the art that pigments added to the polyester composition, whether added to the hardener (catalyst) or resin compound, provide a method of determining the uniformity of the blend of resin and hardener. Although this has been very useful to the trade, it has not solved the problem of determining when the cure takes place and when it is completed. There is a need for a method that will tell the user when the cure has been completed and "finish work" can be done on the cured part. The instant invention will provide the casual, unskilled user in the field with a visual method which will indicate when he has a cure and thus he may proceed with the finishing work or removal of the part from a mold.

Most of the use of polyester compositions has been in the Automotive body filler area. However, increased application are being made in such fields as boat making and repair, sheet molding compounds, open or closed molds, hand laying or chopper gun and other polyester or epoxy application.

Pigments added to the hardener have been known to the trade which uses polyester resins. The pigmented hardener is added to the polyester to give a visual indication of the uniformity of the mix. If the color is blended uniformly, then the hardener and resin are blended uniformly. This uniform blending is necessary to obtain a uniform cure. Pigments added for this purpose are disclosed in U.S. Pat. Nos. 3,181,991 and 3,182,026. These patents do not teach a procedure for determining the cure, only that the blend is uniform. Pigment added to the hardener (catalyst) or resin for determining the cure of polyesters and epoxy by the disappearance of color or fading are disclosed in U.S. Pat. Nos. 4,164,492 and 3,390,121. These do not offer a color change to indicate the cure time but rather a color disapperance or fading and are difficult to discern.

SUMMARY OF THE INVENTION

It is the object of the instant invention to provide a method for the determination of the cure of a unsaturated polyester by employing a pigment added to polyester resin composition which will change color as the cure takes place and becomes complete. When the cure is complete, the color change is complete.

Another object of the instant invention is to provide a method for determining whether uniform mixing of the catalyst (hardener) in the polyester has taken place.

Another object of the instant invention is to compositions incorporating pigments which will indicate when curing has been completed.

These and other objects of the instant invention together with the advantages thereof over existing and prior art forms will become apparent from the following specification and are accomplished by means herein after described and claimed.

DESCRIPTION OF THE PREFERRED EMBODIMENTS

In general the preferred method for determining the degree and cure of unsaturated polyesters includes:

METHOD 1

The unpigmented catalyst (hardener) is added to the resin containing a suitable pigment. The two components are mixed together completely and the blend deposited in the desired place. The resin may or may not contain fillers such as talc, carbonates, clay, barytes, mica, beads, glass fibers, and millings, etc. In polyester systems, the pigment is used in the amounts from 0.025 to 0.40 percent by weight based on the weight of the resin.

METHOD 2

The colored catalyst is added to a resin containing a suitable pigment which results in a color change that indicates when the blend is uniform. This mixture is then placed in the desired place. Cure will be indicated by a second color change which tells the user when to proceed with the necessary finishing work. The resin may or may not contain filler such as Talc, clay, barytes carbonates, micro beads, glass fibers and millings.

Applications of polyester resin compositions are often of varying thickness. Due to the nature of the curing of polyesters, the thick section will cure before the thin section. This improved invention will show the user that the thick section has cured but the thin areas are not ready to be worked on.

In polyester systems the pigment in Method Two is used as follows:

In the resin, the concentration is from 0.025 to 0.40 percent by weight based on the weight of the resin only.

In the catalyst, the concentration is from 0.01 to 10 percent by weight based on the total weight of the catalyst compound.

The pigments which may be employed in the resin are Toluidine Red Y and Parachlor Red trademarks of DuPont Corporation which are 1-[(4-methyl-2-nitrophenyl)azo]-2-naphthalenol and 1-[(4-chloro-2-nitrophenyl)azo]-2-naphthalenol respectively.

The catalyst may be colorless or it may contain iron oxide blue or yellow iron oxide. The amount of catalyst used will determine the cure rate.

When used in automotive repair, the polyester resin will contain fillers. Therefore, the amount of pigment will vary with the type of filler and the amount of any filler used in relation to the resin. In body shop repair the catalyzed polyester is place on the area to be repaired. When cured it must be finished, which includes some or all of the following; cheese grating, sanding, priming, sealing, painting, etc. The polyester must be completely cured to allow this finishing work to begin. This novel invention allows the worker to visually tell when he may proceed with the finishing work. The worker is thus able to work on one or more cars without taking time to check the rate of cure on other vehicles. Furthermore, checking to see if the repair is ready, can damage the repair area and additional work would be required to repair the damage. With this novel invention, visual means of detecting the cure will prevent any damage to the repair surface.

Polyester resins refers to the product of a mixture of one or more unsaturated polyesters with one or more unsaturated compounds which can be reacted together by cross-linking. Unsaturated polyesters are produced by esterifying a saturated or unsaturated dicarboxylic acid or the corresponding anhydride with a saturated or unsaturated polyfunctional alcohol. Examples of these acids are maleic, fumaric, phthalic, itaconic acid and so forth. These acids can be partially replaced by one or more saturated dicarboxylic acids. Examples of these are adipic, sebacic, or succinic acid, and so forth. Examples of the polyfunctional alchols which may be used individually or in blends of two or more are ethylene glycol, diethylene glycol, propylene glycol, triethylene glycol and so forth. The unsaturated polyester obtained by reacting the above is then dissolved in a reactive monomer such as styrene, acrylic compounds, divinyl benzene, or diallylphthalate.

Any peroxide catalyst that can be used for additional polymerization of an unsaturated polyester with an unsaturated monomer can be used in the invention. These are generally organic peroxides and include cumen hydroperoxide, dichlorobenzoyl peroxide, tertiary butyl hydroperoxide, benzoyl peroxide, tertiary butyl perbenzoate, acetyl benzoyl peroxide, caprylyl peroxide, lauroyl peroxide, methylethyl ketone peroxide, and cyclohexane peroxide; ditertiary alkyl peroxides such as ditertiarybutyl peroxide may also be employed.

This invention also can be used where molds are employed for the production of parts. The advantage to this industry would be same as above plus the worker would have a visual method of telling if the part was completely cured and ready for separation from the mold. Areas on the part where color change has not taken place would indicate cold mold etc, and under cured.

It is understood that this novel method can be used in any of several plastic processes such as open mold, pre-mix, hand lay up, SMC* glass chopper guns and others and is not restricted to any one process.

In the following examples, all parts are by weight.

EXAMPLE 1

Polyester Composition

To 400 pounds of polyester resin in a mixer were added:

| | |
|---|---|
| 434 pounds | talc, |
| 50 pounds | micro glass balloons, and |
| .85 pounds | Toluidine Red |

This was mixed until it was uniformly blended.

100 parts of the polyester composition was placed on a flat non-absorbing surface. To this was added 2 parts of benzoyl peroxide hardener and mixed with the polyester composition completely.

As this mixture cured, the color changed from a peach to yellow beige.

EXAMPLE 2

Polyester Composition

To 400 pounds of polyester resin in a mixer, were added:

| | |
|---|---|
| 434 pounds | talc, |
| 50 pounds | micro glass balloons, and |
| .85 pounds | Parachlor Red |

This was blended completely.

100 parts of the polyester composition was placed on a flat surface. To this was added 2 parts of benzoyl peroxide containing iron oxide blue and mixed until completely blended. The color of the blend changed from pink to plum.

At this point, the blended mixture was spread smooth. As this material cured, there was a color change from plum to a green.

EXAMPLE 3

To 100 parts of benzoyl peroxide paste was added 0.21 parts of Toluidine Red in a mixer and blended completely.

100 parts of polyester were mixed with 4 parts of the catalyst. When the cure took place, a color change occurred, from a peach to a yellow.

EXAMPLE 4

To 100 parts of methyl ethyl ketone peroxide, were added 8.4 parts of Toluidine Red in a mixer and blended together completely.

100 parts of a polyester resin and 1 part of the catalyst were mixed together. When cure took place, there was a color change from peach to yellow.

EXAMPLE 5

Polyester Resin

To 100 parts of polyester resin was added 0.084 part of Toluidine Red in a mixer and blended completely.

100 parts of the polyester was mixed with 4 parts of benzoyl peroxide catalyst. When the cure took place, the color changed from a peach to a yellow.

EXAMPLE 6

Polyester Resin

To 100 parts of polyester resin was added 0.084 part of Parachlor Red in a mixer and blended completely.

100 parts of the polyester resin and 1 part of methyl ethyl ketone peroxide were mixed together. When the cure took place there was a color change from peach to yellow.

The embodiments of the invention in which an exclusive privilege or property is claimed are defined as follows:

1. A polyester resin composition comprising a polyester resin, and fillers, the improvement comprising an amount of from 0.025 weight percent to 0.40 weight percent based on the total weight of the resin of 1-[(4-methyl-2-nitrophenyl)azo]-2-naphthalenol pigment.

2. The composition of claim 1 wherein the concentration of pigment is from 0.05 weight percent to 0.15 weight percent based on the total weight of the resin.

3. A polyester resin composition comprising a polyester resin and fillers, the improvement comprising an effective amount of 1-[(4-chloro-2-nitrophenyl)azo]-2-napthalenol said amount being sufficient to offer a composition color change.

4. The composition of claim 3 wherein the concentration of pigment is from 0.025 weight percent to 0.15 weight percent based on the total weight of the resin.

5. The composition of claim 3 wherein the concentration of pigment is from 0.05 weight percent to 0.12 weight percent based on the total weight of the resin.

6. The composition of claim 1 wherein the concentration of filler is from 0 weight percent to 65 weight percent based on the total weight of the resin composition.

7. The composition of claim 6 wherein the filler is selected from the group consisting of talc, glass micro beads, calcium carbonate, and silica.

8. The composition of claim 3 wherein the filler is selected from the group consisting of talc, glass micro beads, calcium carbonate, and silica.

9. The composition of claim 1 wherein the concentration of glass micro beads is 6 weight percent based on the total weight of the resin composition.

10. The composition of claim 3 wherein the concentration of glass micro beads is 6 weight percent based on the total weight of the resin composition.

* * * * *